UNITED STATES PATENT OFFICE.

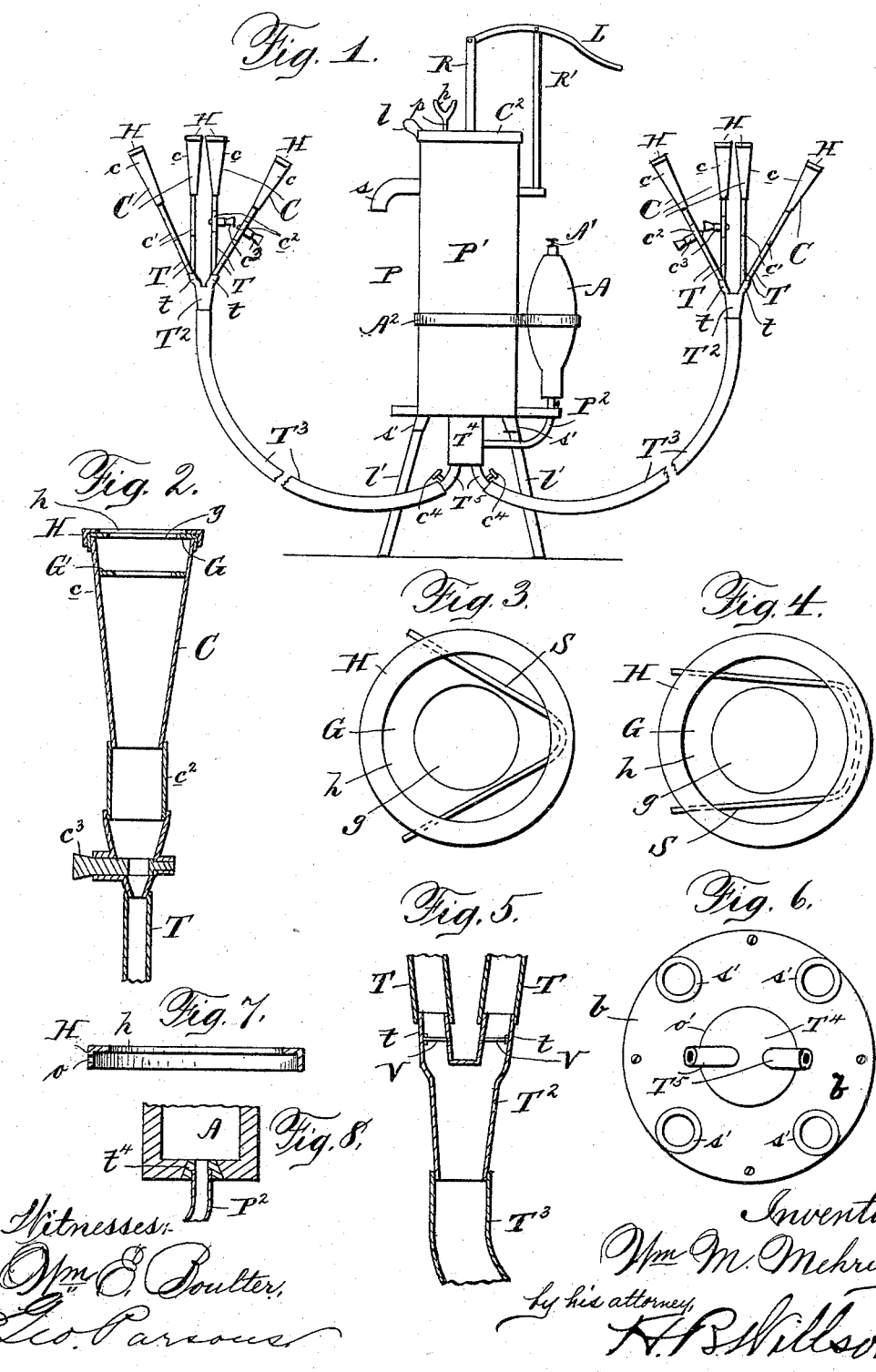

WILLIAM MARSHALL MEHRING, OF YORK ROAD, MARYLAND.

COW-MILKER.

SPECIFICATION forming part of Letters Patent No. 488,282, dated December 20, 1892.

Application filed May 4, 1892. Serial No. 431,823. (No model.)

*To all whom it may concern:*

Be it known that I, WILLIAM MARSHALL MEHRING, a citizen of the United States, residing at York Road, in the county of Carroll and State of Maryland, have invented certain new and useful Improvements in Devices for Milking Cows; and I do hereby declare the following to be a full, clear, and exact description of the invention, such as will enable others skilled in the art to which it appertains to make and use the same.

My invention has relation to devices for milking cows, and relates more particularly to that class wherein a pump is used for drawing the milk from the cow, and among the objects in view are to provide a device of the character described wherein the teat-cups and connected parts are so constructed that injury to the teats or udder of the cow during the milking operation and influx of air to the interior of the cups are avoided; also, to provide means whereby the flow of milk can be viewed during the milking operation and the said flow cut off when desired; also, to provide a pump adapted for use with my milking device which is of simple construction and adapted to supply a continuous flow of milk and with the above and minor objects in view, my invention consists in construction, arrangement and combination of parts, all as hereinafter fully described, illustrated in the accompanying drawings and pointed out in the claims.

In the drawings:—Figure 1 is an elevation of my improved milking device complete, adapted for the milking of two cows simultaneously. Fig. 2 a vertical section through one of the teat-cups and connecting head. Fig. 3 is a plan view of the securing and protecting cap for the elastic disk, showing one form of spring. Fig. 4 a like view showing a different form of spring. Fig. 5 a vertical section through the connecting head and portions of the tubes connected therewith. Fig. 6 is an underside view of the bottom of the pump. Fig. 7 is a vertical section of the elastic disk securing and protecting cap. Fig. 8 is a vertical section through the bottom of the air-chamber and tube connected therewith.

C indicates the teat-cups preferably four in number, one for each teat. These cups I may make of any suitable material such as tin, and are made conical in shape, as shown, the outer or larger end being adapted to receive the teat. Each cup comprises the conical body portion $c$, and the cylindrical glass portion or tube $c'$ one end of which is suitably secured to the smaller end of the portion $c$. I make the portion $c$, preferably somewhat longer than the teat so that during the milking operation when the suction exerted by the pump tends to cause the teat to wedge or be drawn inwardly through the cup, the teat will not be injured by forcible contact or wedging at the smaller end of the cup, while at the same time the conical shape of the cup will cause the teat to be held firmly in place without injury.

To the outer end of each cup I secure a thin rubber disk G which may be secured in position by allowing the edges of it to overlap the end of the cup and being retained on the cup by elasticity, but I preferably increase the hold of the cap on the cup by employing a securing and protecting cap H which fits tightly over the end of the cup and overlapped edges of the disk.

As shown in Fig. 2 I may employ a second elastic disk G' arranged within the cup in proximity to the outer disk G and provided with a central opening to receive the teat the two disks co-operating to retain the cup securely in place.

The caps H as well as the disks G are each provided with an opening $h$, and $g$, respectively, the latter being of a size somewhat smaller than the teat so that when the latter is inserted it will fit tightly and prevent influx of air within the cup. Over each disk G is placed a substantially U-shaped spring S of spring metal, the pointed or curved portion whereof is inserted beneath the rim of the cap H and the ends of said spring projecting through openings $o$, in the said cap. The arms of the spring straddle the opening $g$, in the disk G and the purpose of said spring is to prevent the disks from bulging or turning outwardly during short stops in pumping thus increasing the hold of the disk upon the teat. The lower end of each glass tube $c'$ is connected to one end of a short rubber tube T whose opposite end fits tightly over a short tube $t$, integral with a connecting head $T^2$ to which is fitted one end of a rubber tube $T^3$ which has its opposite end connected to a suction pump, as presently described.

Within each of the tubes $t$, is located a suitable valve V adapted to open toward the head $T^2$ to permit the milk to flow to the pump and to close should the pump cease working. The precise location of these valves is immaterial but they should be located intermediate the main tube $T^3$ and the teat-cups or in the tube $T^3$ itself. If desired the glass portion $c'$ of each cup might be replaced by a metallic section $c^2$ provided with a stop-cock or valve $c^3$ and this arrangement I would adopt for the front teat-cups.

P indicates a suction pump comprising the cylinder P' having discharge spout $s$. The upper end of the pump is closed by a removable cap $C^2$ screwing upon said cylinder and provided with a lug or projection $l$, to adapt it to be readily turned. Instead of screwing the cap on the cylinder it may be secured by set-screws. The lower end of the cylinder is closed by a bottom $b$, bolted thereto having sockets $s'$ cast integral therewith to receive legs $l'$. An opening $o'$ in said bottom receives one end of a tube $T^4$ having branches $T^5$ with stop-cocks $c^4$ and to which said tubes $T^4$ connect the tubes $T^3$. A pipe $P^2$ extends upwardly outside the cylinder and connects pipe $T^4$ with an air-chamber A which is provided at top with a stop-cock A'. A band $A^2$ encircles the air chamber and the cylinder P' and secures said air-chamber in position. The tube $T^4$ has a conical plug of cork $t^4$ at its end which fits tightly yet removably within the lower end of the air-chamber. The pump-rod R is jointed at its upper end to the lever L pivoted to a rod R' secured to the pump cylinder.

The operation of milking is as follows:—If it be desired to milk but one cow, the teats are first moistened and then the two rear teats are inserted within two of the cups. The two cocks $c^3$ $c^4$ are opened and then the lever L is operated in the usual manner whereby the milk will be caused to flow, the action exerted upon the teats being similar to that exerted by a calf when sucking. When the milk begins to flow the remaining cups are attached to the front teats and their cocks $c^3$ opened the pump being continued to be operated and milk will be drawn from all the teats simultaneously.

I would state that the function of the air chamber A is similar to the usual air chamber provided in the ordinary pumps, that is to say, when the lever L is depressed milk is drawn through the pipes $T^3$, $T^4$, from the cow, and a portion of the air exhausted from the chamber A, and when the lever L is raised milk will flow into said chamber, and I have found that by reason of the exhaust of air from chamber A and compression of same therein, the strain upon the cow is relieved and the flow of milk rendered more uniform and constant. When it is desired to discontinue the flow of milk from any one of the front teats its respective stop-cock $c^3$ is closed and when the milking is finished the cups are withdrawn from the teats.

Should it be desired to milk two or more cows simultaneously additional numbers of the devices are connected with the pump as shown in Fig. 1.

The cap of the pump cylinder may have an upright post $p$, with a fork $h$, to receive the tube $T^3$ when the device is not in use.

Many changes might be made in the construction or arrangement of the device without departing from the scope of my invention.

From the foregoing description taken in connection with the accompanying drawings it will be apparent that my device is simple, cheap and can be readily taken apart for cleaning or otherwise.

What I claim and desire to secure by Letters Patent is:—

1. In a device of the character described, the combination with the conical teat-cup of an elastic disk fitted over the larger end of said cup and having an opening, and a cap fitted over said disk and also having an opening and a yielding retaining device arranged over the disk and adapted to prevent the same from turning outwardly, as and for the purpose specified.

2. In a device of the character described, the combination with the conical teat-cup, of an elastic disk fitted over the larger end of the cup and having an opening, a cap fitted over said disk and also having an opening, and a spring fitted between the cap and the disk and straddling the opening in the latter, as and for the purpose specified.

3. In a device of the character described, the combination with the conical teat-cup, of an elastic disk fitted over the larger end of said cup and having an opening, a second elastic disk fitted within the cup adjacent to the outer disk and a cap fitted over the outer disk and also having an opening, and a yielding retaining device arranged over the said outer disk and adapted to prevent the same from turning outwardly, as and for the purpose specified.

4. In a device of the character described, the combination with the conical teat-cups, of elastic disks fitted over the larger ends of the cups and each having an opening, caps fitted over said disks and also having each an opening, the head $T^2$ having short tubes $t$, provided each with a valve, elastic tubes connecting the tubes $t$, with the teat-cups, a tube $T^3$ connected with the head T², a pump, and valved connections between the same and the tube T³ as and for the purpose specified.

5. In combination with a milking device of the character described, a pump provided with screw-cap C having projection $h$, the bottom having sockets, legs fitted in said sockets, and a central opening in said bottom and a tube depending from the bottom and having branch tubes as described, and an air tube extending upwardly without the pump cylinder and communicating with an air chamber, as described.

In testimony whereof I affix my signature in presence of two witnesses.

WILLIAM MARSHALL MEHRING.

Witnesses:
JOHN T. KOONTZ,
GEORGE H. BIRNIE.